(12) United States Patent
Hobson et al.

(10) Patent No.: US 8,171,274 B2
(45) Date of Patent: *May 1, 2012

(54) METHOD AND SYSTEM OF EXECUTING STACK-BASED MEMORY REFERENCE CODE

(75) Inventors: Louis B. Hobson, Houston, TX (US); Mark A. Piwonka, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 115 days.

This patent is subject to a terminal disclaimer.

(21) Appl. No.: 12/848,883

(22) Filed: Aug. 2, 2010

(65) Prior Publication Data

US 2010/0299480 A1   Nov. 25, 2010

Related U.S. Application Data

(63) Continuation of application No. 11/534,708, filed on Sep. 25, 2006, now Pat. No. 7,797,523.

(51) Int. Cl.
*G06F 15/177*   (2006.01)
(52) U.S. Cl. .................. 713/1; 713/2; 713/323
(58) Field of Classification Search .................. 713/1, 2, 713/100, 323, 324
See application file for complete search history.

(56) References Cited

U.S. PATENT DOCUMENTS

| 6,011,546 A | 1/2000 | Bertram |
| 6,691,234 B1 | 2/2004 | Huff |
| 7,797,523 B2 * | 9/2010 | Hobson et al. .................. 713/1 |
| 2002/0199093 A1 * | 12/2002 | Poisner et al. .................. 713/1 |
| 2003/0188173 A1 * | 10/2003 | Zimmer et al. ............... 713/189 |
| 2003/0188212 A1 | 10/2003 | Kahn et al. |
| 2004/0103272 A1 * | 5/2004 | Zimmer et al. .................. 713/1 |
| 2004/0103331 A1 | 5/2004 | Cooper |
| 2005/0015582 A1 * | 1/2005 | Shida et al. .................. 713/2 |
| 2005/0172113 A1 * | 8/2005 | Lee .................. 713/2 |
| 2007/0260867 A1 | 11/2007 | Ethier et al. |

* cited by examiner

*Primary Examiner* — Dennis M Butler

(57) ABSTRACT

A method and system of executing stack-based memory reference code. At least some of the illustrated embodiments are methods comprising waking a computer system from a reduced power operational state in which a memory controller loses at least some configuration information, executing memory reference code that utilizes a stack (wherein the memory reference code configures the main memory controller), and passing control of the computer system to an operating system. The time between executing a first instruction after waking the computer system and passing control to the operating system takes less than 200 milliseconds.

13 Claims, 3 Drawing Sheets

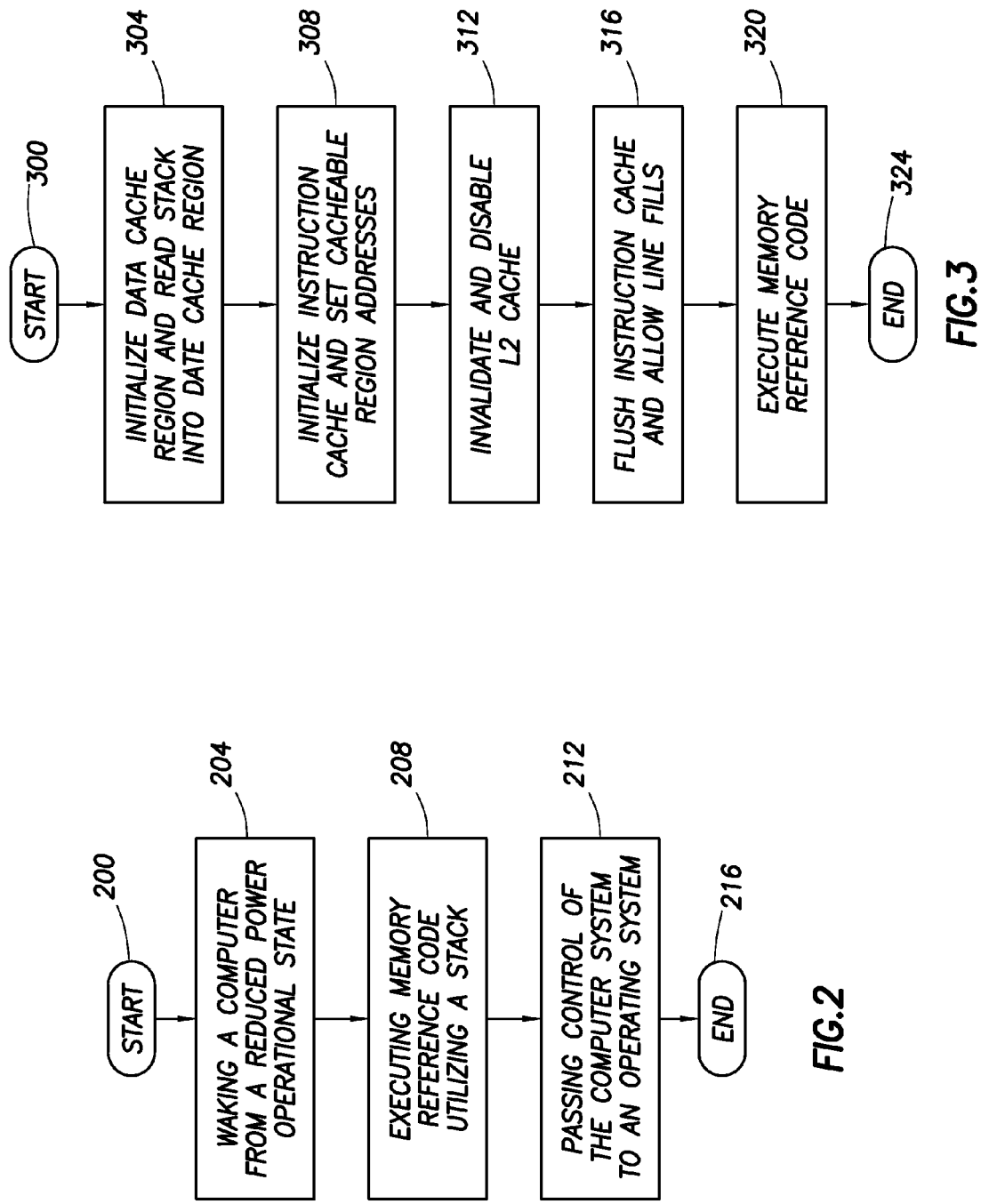

METHOD AND SYSTEM OF EXECUTING STACK-BASED MEMORY REFERENCE CODE

CROSS REFERENCE TO RELATED APPLICATIONS

This application is a continuation of U.S. patent application Ser. No. 11/534,708 filed Sep. 25, 2006 now U.S. Pat. No. 7,797,523.

BACKGROUND

Many computer systems utilize reduced power operational modes. In the case of laptop or notebook computers, the reduced power operational modes were initially used as a mechanism to reduce battery power consumption. However, the reduced power operational modes are now also utilized on desktop computer systems, in some respects to conserve power, but in more significant respects to implement computer systems that are "instantly on".

One of the key parameters in gauging performance of computer systems is a measure of how long the computer system takes to be fully operational. One aspect of the series of events that take place before the computer system is fully operational is execution of memory reference code. Memory reference code initializes the main memory controller in the computer system, and the memory reference code is executed just prior to passing control of the computer system to operating system programs.

Unlike early memory reference code which was written to be executed without the benefit of a stack, more recent memory reference code is written in programming languages requiring a stack (e.g., C, C++). However, at the period of time when the memory reference code is executing, the main memory is unavailable for use as a stack as the memory controller is not yet initialized. For this reason, the processor's cache is configured and utilized as a stack. To keep the memory reference code from inadvertently evicting the stack from the cache, the memory reference code is not cached; instead, the memory reference code is loaded from the relatively slow access read-only memory (ROM) directly to the processor pipelines. Based on the slow execution mode, executing the memory reference code contributes significantly to the amount of time needed to wake a computer system from a reduced power operational mode.

BRIEF DESCRIPTION OF THE DRAWINGS

For a detailed description of exemplary embodiments of the invention, reference will now be made to the accompanying drawings in which:

FIG. 2 shows a method in accordance with at least some embodiments;

FIG. 3 shows a method in accordance with alternative embodiments; and

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to various embodiments of the invention. Although one or more of these embodiments may be preferred, the embodiments disclosed should not be interpreted, or otherwise used, as limiting the scope of the disclosure. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
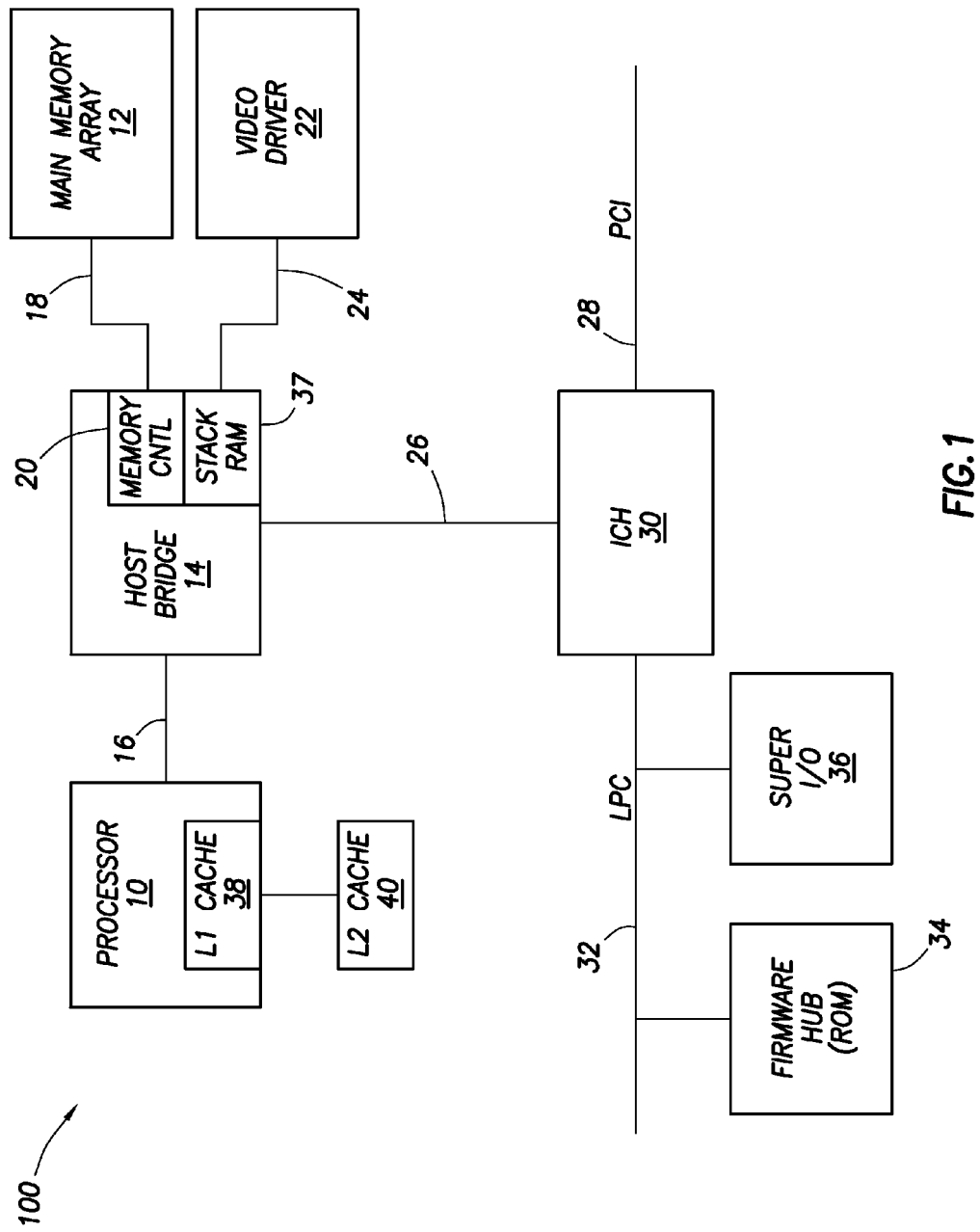
FIG. 1 shows a computer system in accordance with at least some embodiments.

FIG. 1 illustrates a computer system 100 constructed in accordance with at least some embodiments. In particular, computer system 100 comprises a processor 10 coupled to a main memory array 12, and various other peripheral computer system components, through integrated host bridge 14. The processor 10 couples to the host bridge 14 by way of a host bus 16, or the host bridge 14 may be integrated into the processor 10. Thus, the computer system 100 may implement other bus configurations or bus-bridges, in addition to, or in place of, those shown in FIG. 1.

Main memory array 12 couples to the host bridge 14 through a memory bus 18. Those host bridge 14 comprises a memory control unit 20 that controls transactions to the main memory 12 by asserting control signals for memory accesses. The main memory array 12 functions as the working memory for the processor 10 and comprises a memory device or array of memory devices in which programs, instructions and data are stored. The main memory array 12 may comprise any suitable type of memory such as dynamic random access memory (DRAM) or any of the various types of DRAM devices such as synchronous DRAM (SDRAM), extended data output DRAM (EDODRAM), or Rambus DRAM (RDRAM).

In some embodiments the computer system 100 comprises a graphics controller or video driver 22 that couples to the host bridge 14 by way of an Advance Graphics Port (AGP) bus 24, or other suitable type of bus. Alternatively, the video driver 22 may couple to the primary expansion bus 26 or one of the secondary expansion buses (e.g., peripheral components interconnect (PCI) bus 28). The video driver 22 may further couple to a display device which may comprise any suitable electronic display device upon which any image or text can be represented.

Still referring to FIG. 1, the computer system 100 also comprises a second bridge 30 that bridges the primary expansion bus 26 to various secondary expansion buses such as a low pin count (LPC) bus 32 and the PCI bus 28. In accordance with some embodiments, the bridge 30 comprises an Input/Output Controller Hub (ICH) manufactured by Intel Corporation. Although the ICH 30 is shown in FIG. 1 to support only the LPC bus 32 and the PCI bus 40, various other secondary expansion buses may be supported by the ICH 30. In the embodiments shown in FIG. 1, the primary expansion bus 26 comprises a Hub-link bus, which is a proprietary bus of the Intel Corporation. However, computer system 100 is not limited to any particular type of primary expansion bus, and thus other suitable buses may be equivalently used.

Firmware hub 34 couples to the ICH 30 by way of the LPC bus 32. The firmware hub 34 comprises read-only memory (ROM) which contains software programs executable by the processor 10. The software programs comprise not only programs to implement basic input/output system (BIOS) commands, but also instructions executed during and just after power on self tests (POST) procedures and memory reference code executed when the computer system 100 wakes from a reduced power operation state. The POST procedures as well as the memory reference code perform various functions within the computer system before control of the computer system is turned over to the operating system.

A super input/output (I/O) controller 36 couples to the ICH 30 and controls many computer system functions, such as interfacing with various input and output devices such as a keyboard and a system pointing device (e.g., mouse), various serial ports and floppy drives. The super I/O controller 36 is often referred to "super" because of the many I/O functions it performs.

The computer system 100 of FIG. 1 implements a power management protocol, such as, but not limited to, the power management protocol defined by the Advanced Configuration and Power Interface (ACPI) specification. The illustrative ACPI specification defines several operational states for computer system 100. For example, the "G0 working" state is a normal working state of the computer system 100 in which the computer system components are all powered and operational. The illustrative ACPI specification also defines a "G1 Sleeping" state, which itself is divided into four sub-states, S1-S4 with each sub-state utilizing less power but also taking more time to wake. The illustrative sub-state of particular interest in this specification is the "S3" state, which may be alternatively referred to as the stand-by state, the sleep state or state in which the computer system is suspended to RAM. In the S3 state, the main memory array 12 remains powered while almost every other computer system component is powered down. In particular and in relevant part, the processor 10, including its caches 38 and 40, along with the host bridge 14 and its memory controller 20 are powered down in the S3 state. Because the memory controller 20 is powered down, the configuration of the memory controller 20 is lost. Thus, when a wake event occurs (e.g., the user taps a keyboard key or moves the mouse), the memory controller 20 needs to be configured and/or initialized so that the main memory array 12 may be accessed.

When recovering from a reduced power operational state (e.g., the S3 state), the processor 10 configures the memory controller 20 by executing memory reference code stored on the firmware hub 34. The memory reference code configures the memory controller 20, for example, by writing various machine specific and control registers in the memory controller 20 and/or the host bridge 14. In accordance with the embodiments of the invention, the memory reference code is written in a programming language that utilizes a stack when executed (e.g., C, C++, JAVA). However, during the period of time that the memory reference code executes, the memory controller has not yet been configured and thus the main memory array is unavailable for use as a stack.

The various embodiments of the invention are directed to executing memory reference code that utilizes a stack in situations where the computer system is recovering from a reduced power operational mode, and the main memory is unavailable to implement a stack. Rather than utilizing one or both of the caches 38, 40 exclusively for the stack and executing non-cached memory reference code from the firmware hub 34, the memory reference code is executed in whole or in part from the cache, and in some embodiments the stack is also implemented in the cache.

FIG. 2 illustrates a method in accordance with the various embodiments. In particular, the methods starts (block 200) and moves to waking a computer from a reduced power operational state (block 204). In accordance with at least some embodiments, the reduced power operational state is the S3 sleep state as defined by the ACPI specification, although the sleep state may be any state in which the memory controller loses its configuration. Waking the computer system may take many forms, for example, pressing a keyboard key, pressing a wake button on the computer cover, or possibly moving the mouse. After waking the computer, the illustrative method moves to executing memory reference code (block 208). That is, at least a portion of the memory reference code is read into and executed from the cache, and a stack is also created (the precise location of the created stack is discussed below).

Regardless of the mechanism by which the memory reference code that utilizes the stack is actually executed, next step in the illustrative process is passing control of the computer system to an operating system program (block 212) and the illustrative process ends (block 216). In accordance with the various embodiments, the period of time between when the processor first executes an instruction after a wake event until the processor hands control of the computer system over to the operating system (i.e., the processor executes the first instruction of the operating system) takes less than or equal to 200 milliseconds.

Implementing the embodiments of executing the memory reference code at least partially from the cache and also having a stack (block 208 of FIG. 2) takes different forms depending on the embodiment implemented. In some embodiments, both the stack and at least a portion of the memory reference code are held in the cache. With respect to these embodiments, two illustrative types of processors will be discussed (i.e., processors with split level 1 (L1) cache, and processors without split L1 cache).

Turning first to processors with split L1 cache 38, some processors (e.g., Pentium III processors) have a shared L2 cache 40 (i.e., the L2 cache 40 stores both data and instructions), and the L1 cache 38 is actually two separate caches: one for instructions and one for data. Thus, in accordance with the embodiments implemented using processors with split L1 cache 38, a stack is created in the data portion or data cache region of the L1 cache 38, and at least some of the memory reference code is cached and executed from the instruction portion or instruction cache region of the L1 cache 38.

FIG. 3 illustrates a method that may be implemented with respect to processors that have a split L1 cache 38. In particular, the method starts (block 300) and proceeds to initialization of the data cache region and reading the stack into the data cache region (block 304). Next, the instruction cache region is initialized and the processor is configured with the addresses which may be cached within the instruction cache region (block 308). Configuring the processor with the addresses that are allowed to be cached in the instruction cache region involves, in at least some embodiments, writing various registers of the processor. Thereafter, the L2 cache is invalidated and disabled (block 312), again such as by writing appropriate processor registers. The instruction cache region is flushed and set to allow line fills from memory (block 316), the memory reference code is executed (block 320) from the instruction cache region, and the illustrative process ends (block 324).

The memory reference code stored in the firmware hub 34 may be cached, in whole or in part, in the instruction cache region of the L1 cache. Because of the separation between the data and instruction cache regions of the L1 cache 38, as well as the fact that the L2 cache 40 is disabled, the cache line cannot fill to the instruction cache region thereby overwriting stack data in the data cache region. Thus, the memory reference code executes using the stack in the data cache region of the L1 cache 38, and from instructions in the instruction cache region of the L1 cache 38.

Turning now to processors without split L1 cache 38 (e.g, Pentium IV). The method of separating the L1 cache into a data and instruction cache regions and disabling the L2 cache as discussed above is not operational for processors that do not have the split L1 cache 38. However, in accordance with alternative embodiments, the cache of the processor is used as a set of contiguous memory in which the various memory locations cannot be evicted, and thus the stack and at least some of the instructions of the memory reference code are contained within the cache of the processor.

Figure 4:
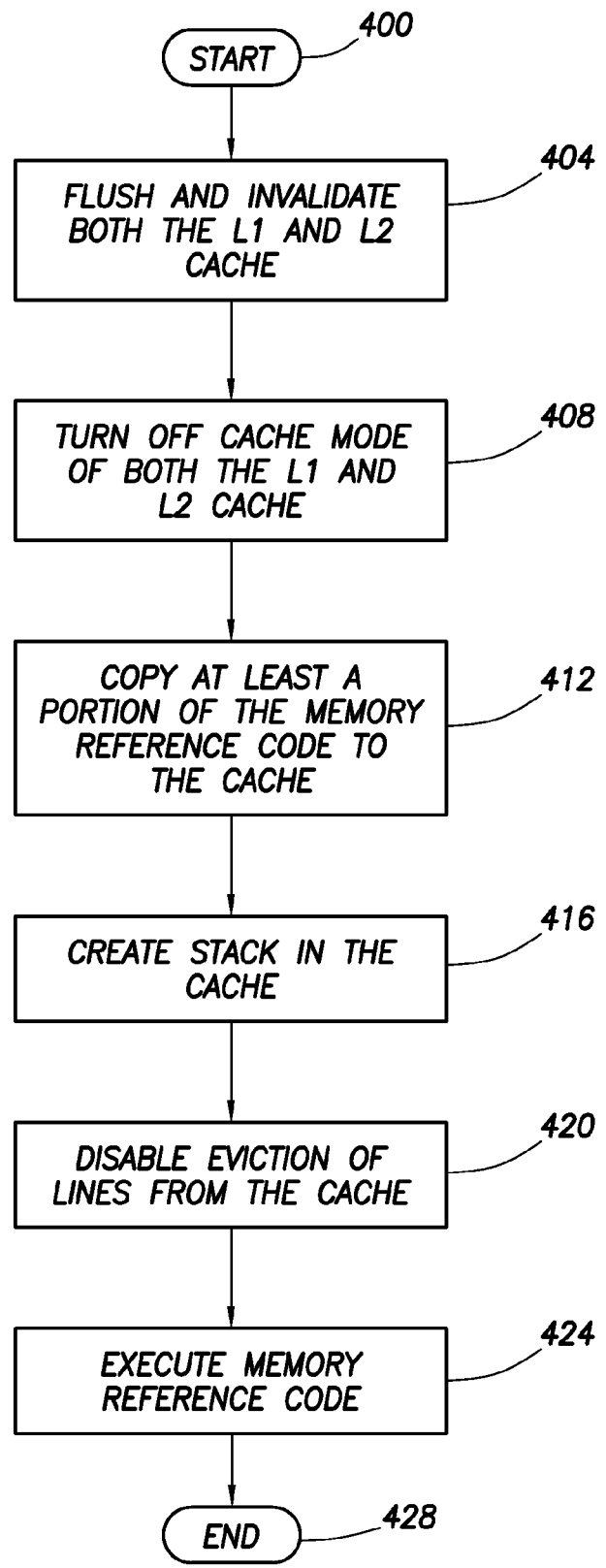
FIG. 4 shows a method in accordance with yet still further alternative embodiments.

FIG. 4 illustrates a method in accordance with alternative embodiments where the processor cache is used as other than a cache memory. In particular, the method starts (block 400) and proceeds to a flush and invalidation of both the L1 and L2 cache (block 404). Next, the cache mode for both the L1 and L2 caches is turned off (block 408), which causes the L1 and L2 caches appear to the processor as contiguous addressable memory. The processor then copies at least some of the memory reference code from the firmware hub 34 to the cache (block 412), such as by reading the various memory locations in the firmware hub 34 that store the memory reference code. If the cache is sufficient size and/or the memory reference code is sufficiently small, it is possible that the entire set of instructions forming the memory reference code may be stored in the cache. The processor then creates the stack in the cache (block 416), such as by reading data locations that do not overlap with the main system memory. Eviction of lines from the cache is disabled (block 420), such as by enabling a "no eviction" mode. Finally, the memory reference code executes at least in part from the cache, utilizing the stack stored within the cache (block 424), and the process ends (block 428).

In the illustrative situation where the entire memory reference code is held within the L1 and L2 caches treated as contiguous memory, the entire operation may take place with instructions stored in the cache. In the case where the cache is relatively small and/or the memory reference code is relatively large, at least some of the memory reference code is executed from the cache, and the remaining portions of the memory reference code is read directly from the firmware hub 34 to the processor pipeline (without being placed in the cache). Even in situations where some of the memory reference code is read from and directly executed from the firmware hub 34, executing at least some of the memory reference code from the cache rather than from the firmware hub 34 significantly decreases the amount of time between when the processor first begins executing instructions after the S3 wake event, and when the memory reference code hands control over to the operating system.

Referring again to FIG. 1, the various embodiments discussed to this point execute the memory reference code from the cache (at least in part) along with the stack being implemented in the cache. In alternative embodiments, only the memory reference code itself is cached and then executed from the cache, and the stack is implemented in an alternative location. These alternative embodiments implement a small portion of RAM at any location in the computer to which memory cycles may be directed, such as within the host bridge 14 or by devices coupled to the primary or secondary expansion buses. The small RAM is termed herein stack RAM 37, and is illustratively shown in the host bridge 14. Stack RAM 37 may be relatively small (i.e., on an order of 64 kilo-bytes of SDRAM), but the stack RAM 37 is readable and writable before the memory controller 20 has been fully initialized. In these alternative embodiments, the processor 10 caches the memory reference code in whole or in part in the L1 and/or L2 cache 38, 40, and also implements the stack for memory reference code in the stack RAM 37. In this way, the memory reference code has a stack available in RAM, and also may execute the memory reference code from cache rather than the significantly slower execution directly from the firmware hub 34.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method comprising:
    transitioning a computer system from a low power state to a working state in which a memory controller loses at least some configuration information such that the transitioning includes waking the computer system from an S3 state as defined by Advanced Configuration Power Interface (ACPI) specification;
    storing a stack and at least a portion of a memory reference code in a cache memory wherein various memory locations cannot be evicted such that the storing includes storing the stack and the at least portion of the memory reference code in at least one of a level 1 cache and a level 2 cache;
    executing the memory reference code that utilizes the stack, and wherein the memory reference code configures the memory controller; and
    passing control of the computer system to an operating system.

2. The method of claim 1 further comprises:
    flushing the level 1 cache and level 2 cache if the cache memory is used as other than cache memory.

3. The method of claim 1 wherein storing further comprises:
    storing the stack in the memory locations that cannot be evicted.

4. The method of claim 1 wherein the various memory locations are cache lines storing the stack.

5. The method of claim 1 further comprises reading directly from a firmware hub to a processor pipeline a portion of the memory reference code not stored in the cache memory.

6. A computer system comprising:
    a memory array;
    a processor;
    a memory controller coupling the processor to the memory array; and
    a memory device coupled to the processor, the memory device to store a memory reference code that utilizes a stack and to initialize the memory controller after power up from a reduced power operational state; and
    a cache memory to store at least a portion of the memory reference code from the memory device and the stack if the computer system is transitioning to a working state such that the transitioning includes waking the computer system from an S3 state as defined by the Advanced Configuration Power Interface (ACPI) specification, the cache memory is a contiguous memory space and at least a portion of the cache memory is not evictable; and wherein the processor executes a portion of the memory reference code from the cache memory in response to the waking the computer system from the S3 state.

7. The computer system of claim 6, wherein the cache memory is selected from level 1 cache and level 2 cache.

8. The computer system of claim 6, wherein a portion of the memory reference code is executed from the memory device by the processor.

9. The computer system of claim 6, wherein the stack is stored in the portion of the cache memory that is not evictable.

10. The computer system of claim 6 wherein a portion of the memory reference code and the stack is store in the contiguous memory space of the cache memory, wherein the stack is stored in the portion of the cache memory that is not evictable.

11. The computer system of claim 6 wherein the cache memory includes an instruction cache for the memory reference code and a data cache for the stack.

12. A computer system comprising:
a memory reference code on a non-volatile memory;
a contiguous cache memory organized by lines, the contiguous cache memory to store a portion of the memory reference code and a stack;
a processor to execute the memory reference code, to read the stack from the contiguous cache memory in response waking the computer system from an S3 state as defined by the Advanced Configuration Power Interface (ACPI) specification, and to disable eviction of the stack from the contiguous cache memory by the eviction of a portion of the lines; and
a memory controller to be initialized by execution of the memory reference code by the processor.

13. The computer system of claim 12, further comprising an operating system initialized by the processor if the memory controller is initialized.

* * * * *

UNITED STATES PATENT AND TRADEMARK OFFICE
CERTIFICATE OF CORRECTION

| | |
|---|---|
| PATENT NO. | : 8,171,274 B2 |
| APPLICATION NO. | : 12/848883 |
| DATED | : May 1, 2012 |
| INVENTOR(S) | : Louis B. Hobson et al. |

Page 1 of 1

It is certified that error appears in the above-identified patent and that said Letters Patent is hereby corrected as shown below:

In the Claims:

In column 7, line 19, in Claim 10, delete "store" and insert -- stored --, therefor.

Signed and Sealed this
Fourteenth Day of May, 2013

Teresa Stanek Rea
*Acting Director of the United States Patent and Trademark Office*